(12) United States Patent
Taunton

(10) Patent No.: US 6,591,013 B1
(45) Date of Patent: Jul. 8, 2003

(54) SWITCHING BETWEEN DECODED IMAGE CHANNELS

(75) Inventor: Mark Taunton, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/273,722

(22) Filed: Mar. 22, 1999

(51) Int. Cl.$^7$ .................................................. G06K 9/36
(52) U.S. Cl. ...................................................... 382/233
(58) Field of Search ................................ 382/232–239; 375/240.2–240.25; 325/114, 131, 135–142; 348/413.1–416.1; 370/431–444

(56) References Cited

U.S. PATENT DOCUMENTS

| | | | |
|---|---|---|---|
| 5,278,646 A | | 1/1994 | Civanlar et al. |
| 5,418,782 A | * | 5/1995 | Wasilewski .................. 348/906 |
| 5,452,290 A | * | 9/1995 | Mihm ......................... 370/436 |
| 5,724,091 A | * | 3/1998 | Freeman et al. ............. 725/138 |
| 6,020,930 A | * | 2/2000 | Legrand ...................... 348/569 |
| 6,031,842 A | * | 2/2000 | Trevitt et al. ............... 370/412 |
| 6,078,594 A | * | 6/2000 | Anderson et al. ........... 348/462 |
| 6,175,595 B1 | * | 1/2001 | Keesman ................. 375/240.25 |

FOREIGN PATENT DOCUMENTS

| | | |
|---|---|---|
| WO | WO 99/19741 | 2/1999 |

* cited by examiner

*Primary Examiner*—Jingge Wu
(74) *Attorney, Agent, or Firm*—Nixon & Vanderhye P.C.

(57) ABSTRACT

An image data decoding system (2) is described in which a stream of compressed image data (1) corresponding to a plurality of image channels (ChA, ChB, ChC) each comprising intra-coded pictures (I) and inter-coded pictures (B, P) is received. A selected channel within the plurality of channels is fully decoded to produce display driving data. At least one non-selected channel is at least partially processed by the system even though it is not being displayed such that if a switch is made to that non-selected channel then display driving data for that newly selected channel can be produced without having to wait for the next intra-coded picture (I) to be received. The partial processing may take the form of merely buffering the compressed data for the non-selected channel. Alternatively, reference pictures or all pictures for the non-selected channel may be either fully decoded, or partially decoded to produce spatially sub-sampled versions of the pictures of the non-selected channels.

3 Claims, 8 Drawing Sheets

SWITCHING BETWEEN DECODED IMAGE CHANNELS

BACKGROUND OF THE INVENTION

1. Field of the Invention

This invention relates to the decoding of image data for driving an image display. More particularly, this invention relates to systems that decode image data encoded as a sequence of intra-coded and inter-coded image pictures.

2. Description of the Prior Art

It is known to provide image data decoding systems for decoding a stream of compressed image data representing a plurality of image channels. An example of such a system is MPEG-based digital television. The use of intra-coded and inter-coded image pictures within such systems provides a high degree of image data compression. Intra-coded image pictures are periodically inserted to provide a starting point for decoding the relevant image channel when that channel is selected. It will be appreciated that inter-coded image pictures rely on previously received and decoded data in order that they can themselves be decoded. Accordingly, when an image channel is first being decoded, this previously decoded data may not be available. For this reason, intra-coded image pictures are typically inserted at intervals so that the self-contained data for such pictures may be decoded without reliance on any previously decoded data and so provide a starting point for the decoding of the image channel concerned.

Whilst it is desirable to frequently insert intra-coded image pictures within the data stream to provide starting points for decoding, the associated disadvantage is that intra-coding is generally less efficient than inter-coding and so too many intra-coded image pictures will result in a disadvantageous decrease in the degree of compression achieved. Within a typical MPEG-based digital television system, intra-coded image pictures are inserted between one and two times per second. In some contexts intra-coded pictures may occur even less frequently.

U.S. Pat. No. 5,594,492 discloses techniques for assisting in switch between channels.

SUMMARY OF THE INVENTION

Viewed from one aspect the present invention provides image data decoding apparatus for decoding a stream of compressed image data representing a plurality of image channels, each image channel being encoded as sequence of intra-coded and inter-coded image pictures with decoding of a channel starting from an intra-coded image picture, said image data decoding apparatus comprising:

(i) a selected channel decoder for decoding a currently selected image channel to generate display data for driving an image display to show said currently selected channel; and (ii) a non-selected channel processor for at least partially processing at least one non-selected channel from said plurality of image channels such that switching to generating display data for driving said image display to show said at least one non-selected channel can be made without having to wait for a next intra-coded image picture to be received.

The present invention recognises that the time spacing between intra-coded image pictures can produce an undesirable delay in the time taken to display a new channel when switching between channels. Television viewers often rapidly switch between channels in order to determine which programs are being shown on each channel so that they can select the channel they wish to view. In this context, whilst a delay of up to a second in being able to display a newly selected channel may not seem too disadvantageous, it can in practice inconvenience the user of the system and prove irritating.

The present invention both recognises this problem and provides the solution of at least partially processing the data associated with at least one non-selected channel. By not simply discarding the data associated with non-selected channels, it is possible when a switch is made to a channel that has been so partially processed to generate image pictures of that newly selected channel without having to wait for the next intra-coded image picture to be received. This provides a noticeable degree of improved usability to the system.

Whilst it may seem wasteful to process such non-selected channels in this way, in practice the additional memory and processing requirements have been found to be relatively minor and more than acceptable to achieve the improved speed with which a new channel may be displayed.

It will be appreciated that the selected channel decoder and the non-selected channel processor can be embodied as the same device or separate devices.

One way in which the data of a non-selected channel may be partially processed is to simply buffer the compressed data in its raw form. Subsequently when a switch is made to a channel for which the raw data is buffered, the buffered data may be decoded to "catch up" in time to a current image picture for display. In general, this decoding process must process the data faster than "real time" in order to catch up.

Preferred embodiments of such systems recognise that the finite amount of time taken to perform such "catch-up" processing may in some circumstances exceed the time that would be taken to merely wait for the next intra-coded image picture to be received in the compressed image data and then decode that intra-coded image picture. Accordingly, preferred embodiments save on the amount of buffer storage required and produce a display of a newly selected channel at least as quickly by determining whether or not the next intra-coded image picture will be received in less than a threshold time, and, if so, waiting for the next intra-coded image picture rather than decoding the buffered compressed image data.

Alternatively, the system may attempt catch up decoding as it removes data from the buffer but also check the received data for the arrival of an intra-coded picture at the point where the data enters the buffer. If an intra-coded picture is received then this may be used as a starting point rather than completing the catch up decoding. This approach is well suited to situations in which intra-coded pictures are not received at regular intervals.

If there is sufficient spare processing capacity when steady state decoding a selected image channel, alternative embodiments may act to at least partially decode the non-selected channels. Using this spare processing capacity during the steady state reduces the processing required for any "catch-up" operation when a new channel is selected so that the delay before the new channel can be displayed is reduced.

In some embodiments it may be possible to fully decode the non-selected channels. However, it will be appreciated that fully decoding the channels in this way will require additional data storage for the full decoded image pictures and the processing load involved in fully decoding a channel may mean that fewer non-selected channels can be partially processed ready for if a switch is made to them.

Alternative embodiments may balance these considerations by at least partially decoding the data fiom a non-selected channel to form a spatially sub-sampled version of the non-selected channel. Such a spatially sub-sampled version will require less data storage and less processing capacity in the steady state so allowing less expensive systems to be used or more non-selected channels to be partially decoded.

The spatially sub-sampled version of a non-selected channel will not allow a full resolution version of the image pictures to be displayed immediately upon selection of a new channel, but in practice the viewer's eye is more sensitive to being able to see a moving image of the new channel as soon as it is selected rather than to whether the newly selected image channel has a slightly degraded image quality for the first few pictures that are displayed until the next intra-coded image picture is received.

In systems including coded pictures not themselves used as reference pictures, these may be discarded rather than consuming resources in their buffering or decoding. A preferred embodiment discards the data for such pictures upon receipt and avoids ever buffering them. Alternatively a simpler embodiment may discard the pictures as the data is read out of the buffer.

As mentioned above, there is a trade-off between the number of non-selected channels that can be partially processed against the system requirements or image quality when a channel is first selected. Improved use may be made of the system resources in preferred embodiments in which the non-selected channels that are at least partially processed include one or more of a channel having a number one higher then the selected channel in an ordering associated with the channels, a channel having a number one lower then the selected channel in the sequence of channel identifiers, a channel selected immediately prior to the currently selected channel, a channel determined from prior use to be frequently selected for display and a channel currently highlighted within an on-screen selection list.

The above choice of which non-selected channels are to be at least partially processed is based upon the realisation that a viewer often moves between channels by pressing either the "channel-up" button or the "channel-down" button on the system controller, switches between channels using the "previously-selected-channel" button on the system controller or by selecting a highlighted channel from a displayed list or from the pattern of prior use is known to frequently select a particularly favoured channel or channels. In this way, the new channel that a viewer is most likely to select will be available for display more rapidly.

Viewed from another aspect the invention provides an image data decoding method of decoding a stream of compressed image data representing a plurality of image channels, each image channel being encoded as sequence of intra-coded and inter-coded image pictures with decoding of a channel starting from an intra-coded image picture, said image data decoding method comprising the steps of:

(i) decoding a currently selected image channel to generate display data for driving an image display to show said currently selected channel; and (ii) at least partially processing at least one non-selected channel from said plurality of image channels such that switching to generating display data for driving said image display to show said at least one non-selected channel can be made without having to wait for a next intra-coded image picture to be received.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
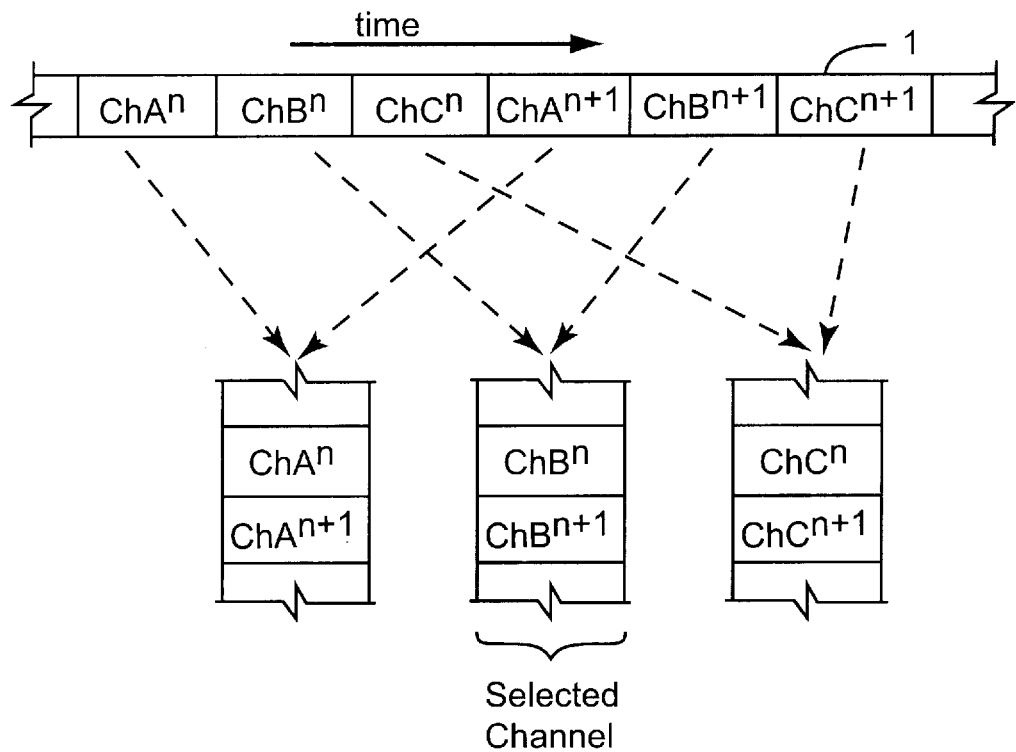
FIG. 1 illustrates a stream of compressed image data representing a plurality of image channels.

FIG. 1 shows a stream of compressed image data 1 comprising of a plurality of data blocks. Each data block is associated with a particular image channel. By examining the channel identifiers associated with each data block, the data blocks required to decode a particular channel may be separated from one another. It will be appreciated that the data blocks need not necessarily correspond to individual image pictures depending on the data block size. The boundaries of coded pictures and data blocks need not coincide. For example, an intra-coded image picture may extend over many data blocks whereas a single data block may contain data corresponding to multiple bi-directionally inter-coded image pictures. It will be further appreciated that the stream data will typically also include control data and audio data corresponding to the image pictures of a channel and which when processed together with the image channel data will allow the presentation of a complete program.

Figure 2:
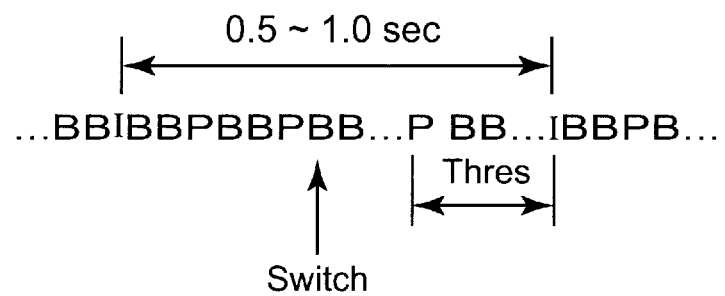
FIG. 2 schematically illustrates the sequence of intra-coded image pictures and inter-coded image pictures within a channel.

FIG. 2 illustrates an MPEG-based sequence of image pictures. Intra-coded image pictures I are inserted within the data stream for a given channel with a spacing of typically half a second to one second. Between such intra-coded image pictures I, the image pictures are coded as either bi-directionally inter-coded image pictures B or predictively inter-coded image pictures P. The intra-coded image pictures I and the predictively inter-coded image pictures P form reference pictures from any consecutive pair of which bi-directionally inter-coded image pictures B may be constructed.

FIG. 2 illustrates a switch to the channel shown being made at a time falling between two intra-coded image pictures I. In prior art systems, the subsequent B and P pictures could not be decoded properly until the next I picture was received and so the new channel would not be displayed until the next I picture had been received and decoded. The present invention addresses this problem by at least partially processing the data illustrated in FIG. 2 even if that channel is non-selected (providing it is one of the channels that is selected for partial processing) such that upon the switch occurring a picture may be generated without having to wait until the next I picture is received.

Figure 3:
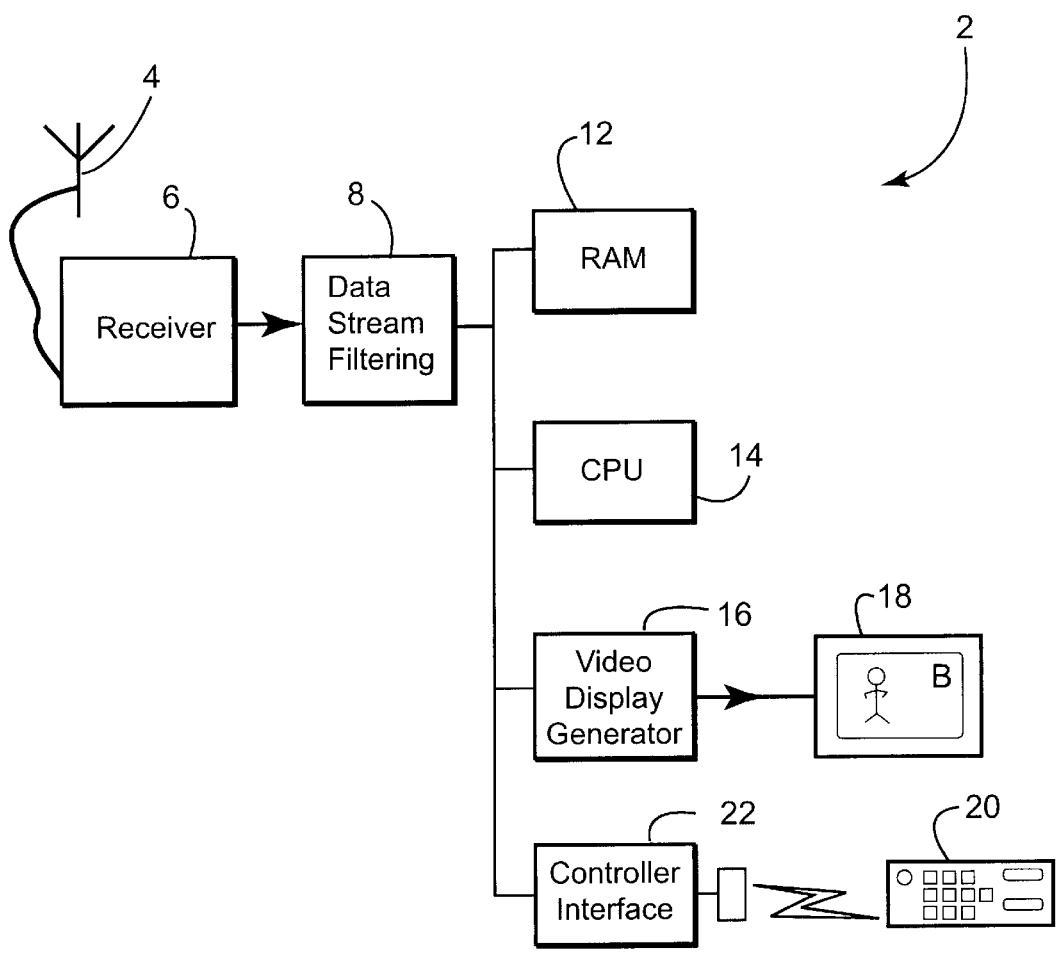
FIG. 3 schematically illustrates a system for decoding image data.

FIG. 3 illustrates a software based digital television decoding system 2. The stream of compressed image data is received at an aerial or satellite dish 4 and passed to a receiver circuit 6. The receiver circuit 6 recovers the digital signal from the transmission. A stream of data similar to that shown in FIG. 1 is passed to a data stream filtering circuit 8 that serves to discard those blocks of data corresponding to channels that are neither the currently selected channel nor a channel being partially processed such that a rapid switch may be made to it if that partially processed channel is selected. Those data blocks not discarded by the data stream filtering circuit 8 are passed via a common data bus 10 to be stored within a memory 12.

A central processing unit 14 operates under software control using a program stored within the memory 12 (this could be sotred elsewhere in other embodiments) to fully decode the selected channel. The fully decoded display driving data for the selected channel that is produced by the central processing unit 14 is passed to a video display generator 16 where it is used to produce display driving signals for driving a television 18. Alternatively, the whole of the system illustrated in FIG. 3 may be embedded within a television.

The central processing unit 14 partially process one or more non-selected channels. The partially processed non-selected channels may be those having channel identifiers (channel numbers) one up and one down (in a sequence as ordered by the remote controller) from the currently selected channel, the previously selected channel, a channel highlighted on an on-screen selection list and/or a channel or channels known from previous use of the system 2 to be often selected.

A remote control handset 20 is provided to allow a viewer to select the channel they wish to view. This remote control handset communicates (e.g by an IR signal) with a controller interface circuit 22 to indicate to the central processing unit 14 which channel is to be the currently selected channel for decoding and display. The central processing unit 14 responses to changes in the selection by updating the data stream filtering circuit 8 so as to adjust which channel are selected or partially processed or discarded.

The manner in which the central processing unit 14 at least partially processes the non-selected channels will be described in more detail below.

Figure 4:
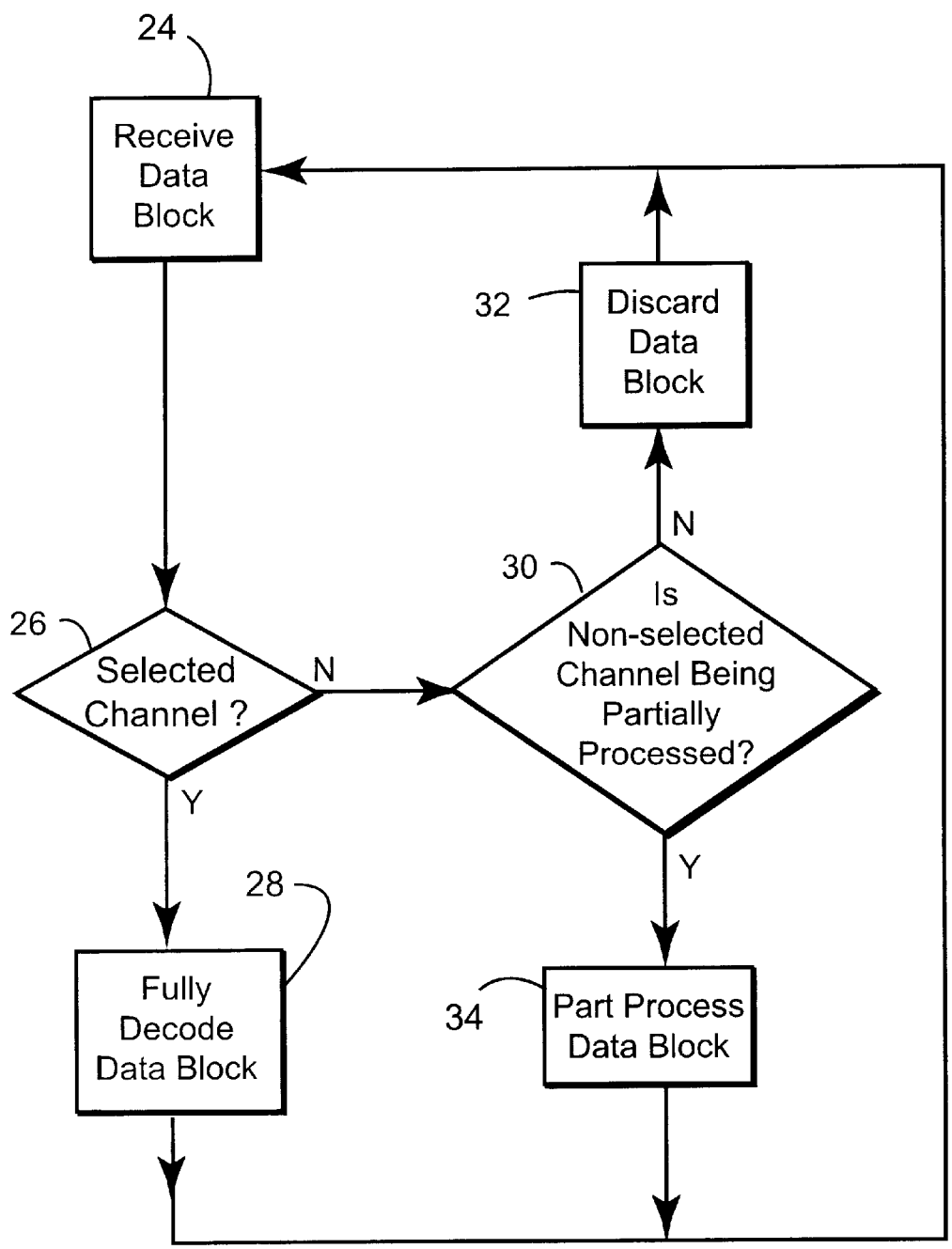
FIG. 4 is a flow diagram illustrating pre-processing performed upon received data blocks.

FIG. 4 illustrates the action of the data steam filtering circuit 8 and at least part of the action of the central processing unit 14. At step 24 a block of data is received from the receiver 6. At step 26 the data stream filtering circuit 8 and central processing unit 14 determine whether or not the data block corresponds to the selected channel. If the data block does correspond to the selected channel, then it is fully decoded at step 28. If the data block does not correspond to the selected channel, then step 30 determines whether or not it corresponds to a channel being partially processed.

If the block does not correspond to a channel being partially processed, then it is discarded at step 32. If the block does correspond to a channel being partially processed then it is at least partially processed at step 34.

Control data is also embedded within the received data stream. For example, in the case of an MPEG-type system, the data stream will include at least a PAT table and PMT tables that identify which channels are within the data stream and the characteristics of those channels. Such control data and other data, for example audio data, for the complete program has to be captured and processed for both the selected channel and the partially processed channels in order to allow rapid display of the partially processed channel upon a switch to it without having to await and decode the corresponding control data.

It will be appreciated that step 32 may be performed by the data stream parsing circuit 8 not passing the data block into the memory 12. The steps 28 and 34 are performed by both the data stream filtering circuit 8 and the central processing unit 14 in combination. The data stream filtering circuit 8 serves to store those data blocks not being discarded into the memory 12. The central processing unit 14 then recovers the data block from the memory 12 and either fully decodes it if it corresponds to the selected channel or partially processes it if it belongs to a partially processed but non-selected channel. In some embodiments where the partially processed non-selected channels are merely buffered, then the central processing unit 14 may do little more with these blocks than control their discarding from the memory 12 as more up-to-date data blocks from their channel are received making those already stored obsolete.

Figure 5A:
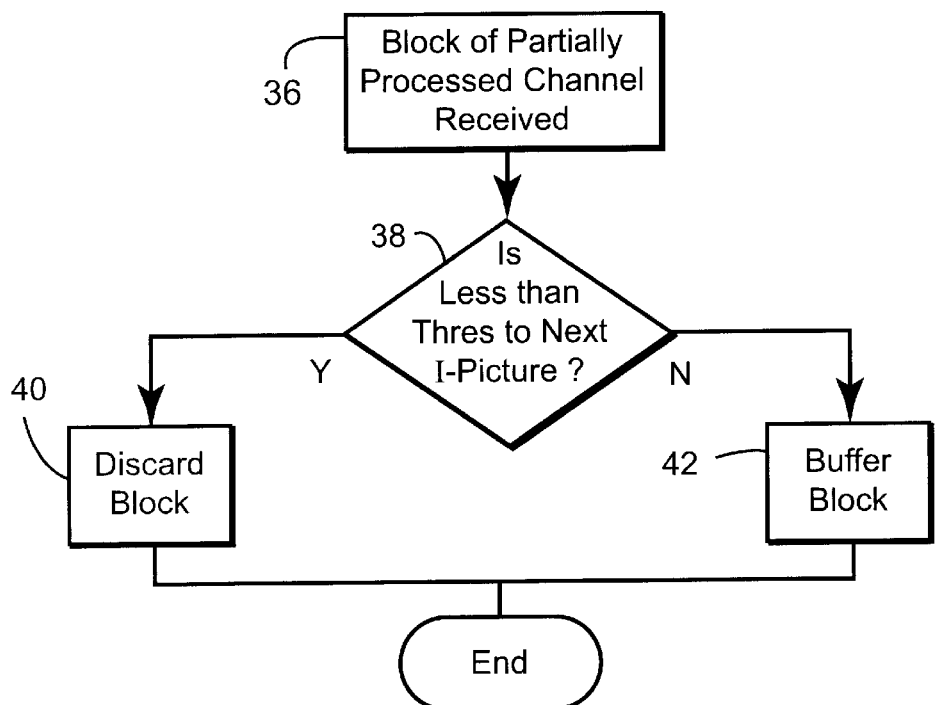
FIGS. 5A, 5B and 5C illustrate different ways in which image data for a non-selected channel may be at least partially processed.

FIG. 5A illustrates a first embodiment for partially processing the data of a partially processed but non-selected channel. At step 36 a block of data from a partially processed channel is received. At step 38 a determination is made as to whether or not that block corresponds to a picture that is less than a threshold time within that partially processed channel from when the next intra-coded image picture I will be received. If the determination is positive, then the block is discarded at step 40 (along with any already buffered data for that partially processed channel) since should the partially processed channel be selected, then it would be quicker to wait for the next intra-coded image picture I to be received rather than to "catch-up" process the buffered raw data. If the result at step 38 is negative, then the data block is buffered within the memory 12 by step 42.

An alternative approach is to attempt "catch up" processing upon the buffered data whilst also checking the received data for the next intra-coded picture. The checking for intra-coded image pictures I happens as data would enter the buffer whereas the "catch up" processing is performed using data already stored in the buffer processing the earliest data received first. If the next intra-coded picture is received before the catch up processing is complete, then the catch up processing may be terminated and decode and display of the newly selected channel started from the received intra-coded picture. This approach is well suited to systems including irregularly spaced intra-coded pictures.

Figure 5B:
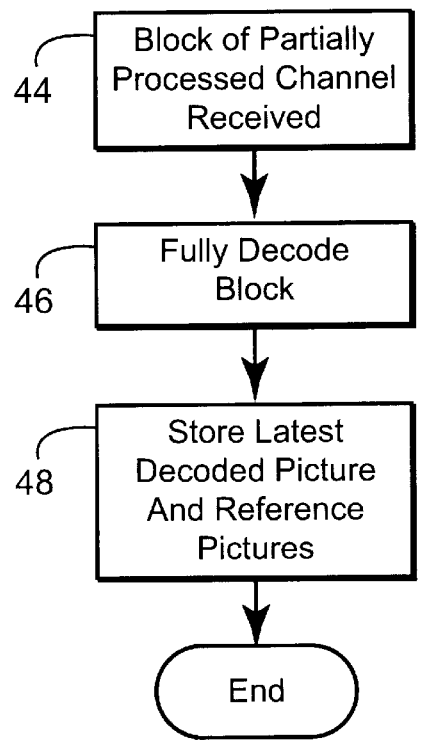

FIG 5B illustrates a second embodiment. If a block of data of a partially processed channel is received at step 44, then step 46 serves to fully decode that block. This fully decoded data is not used to drive a display since the partially processed channel is non-selected, but at least some of the fully decoded data needs to be stored within the memory 12. In practice, the latest decoded picture (whether B, P or I) is stored together with the latest reference pictures (whether I or P). B pictures need not be stored once they are not the current picture, and I or P pictures need not be stored once no following pictures will depend upon them for their decoding. Optionally, B pictures need not be decoded at all, while the channel is not the selected channel, to reduce the processing load if desired.

Figure 5C:
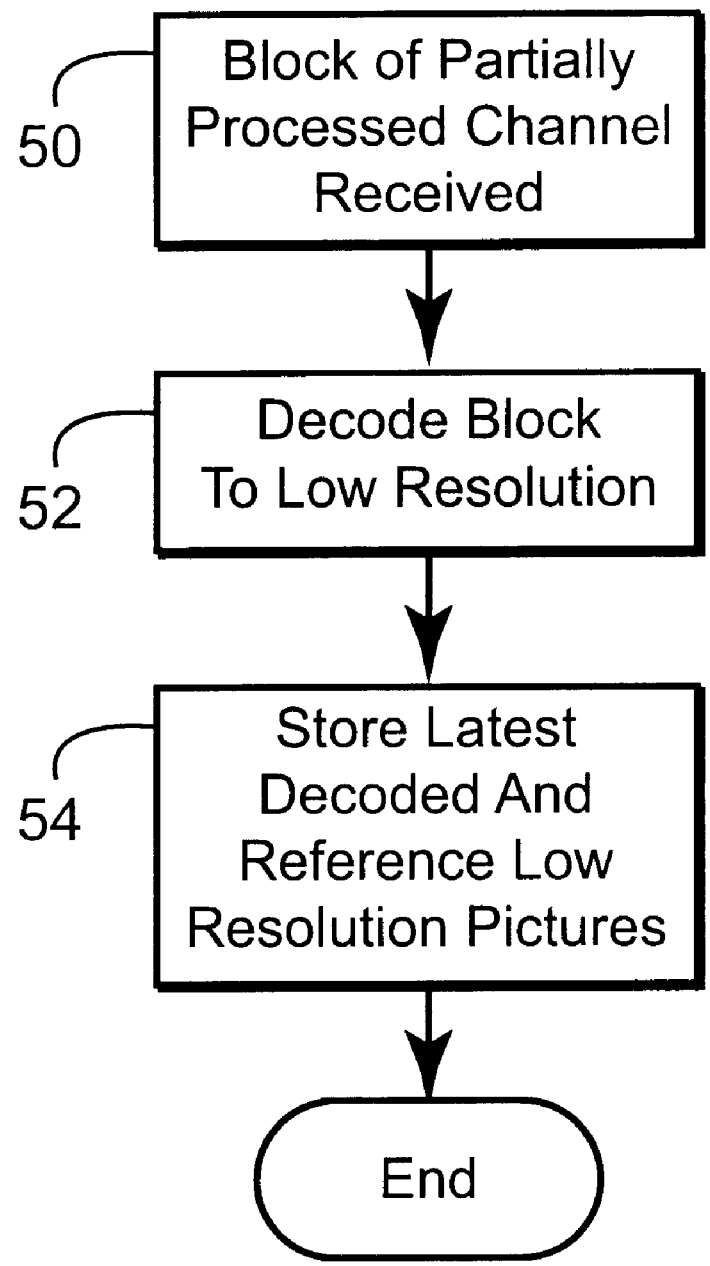

FIG. 5C illustrates a third embodiment in which a received block of a partially processed non-selected channel is received at step 50. At step 52 the central processing unit 14 acting under software control decodes the block to a low resolution picture. One way of doing this would be to merely decode the DC levels of each 8×8 block in a reference picture and use suitable arithmetic to deal with motion prediction from multiple 8×8 blocks into a new 8×8 aligned block. In this way, each reference picture would be decoded as if it were an MPEG 1 "D" picture. This technique would reduce the storage space needed for each picture by up to a factor of 64 and would make the decoding processing load low.

Another technique might be to sub-sample the data, to a resolution reduced by a factor of two or four in each dimension. This could be achieved by using only the lower spatial frequencies in the IDCT coefficients together with methods for scaling predictions. Techniques for such sub-sampling are also described in U.S. Pat. No. 5,262,854.

As these partially processed non-selected pictures are decoded to a low resolution in step 52, they are be stored back into the memory 12 at step 54 for use should that partially processed non-selected channel become the selected channel.

The central processing unit 14 also acts to discard out of date decoded pictures for partially processed non-selected channels.

Figure 6A:
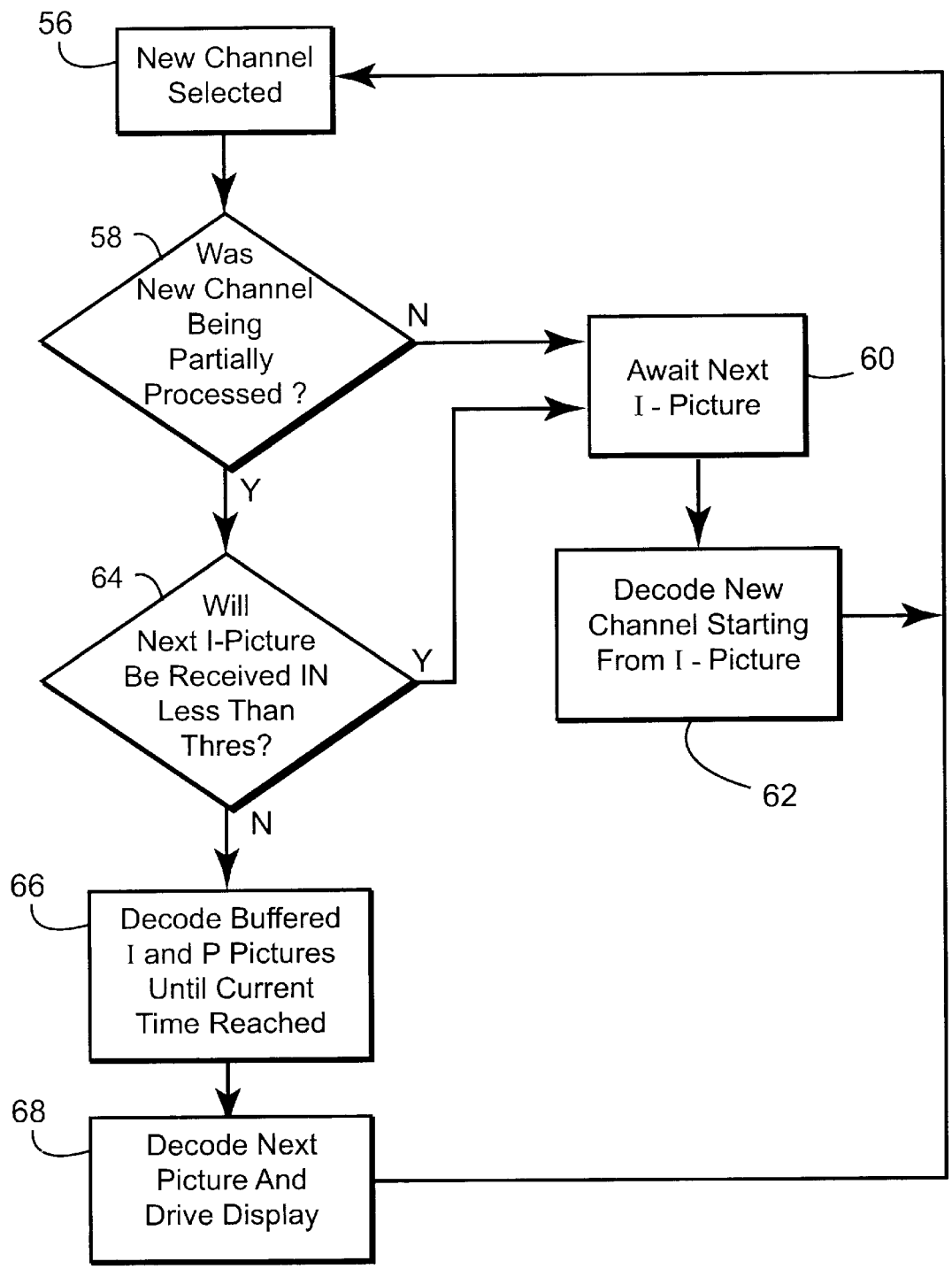
FIGS. 6A, 6B and 6C illustrate different ways in which image data for driving a display may be generated for a newly selected channel depending upon the manner in which that previously non-selected channel had been at least partially processed.

FIG. 6A illustrates the processing performed when a new channel is selected (step 56) in a first embodiment. This embodiment corresponds to the FIG. 5A embodiment. Step 58 determines whether the new channel is one that was being partially processed. If the answer is negative, then the system awaits the next I picture at step 60 and then decodes the data starting from the next I picture at step 62.

If the determination at step 58 is positive, then step 64 determines whether or not the next I picture will be received in less than a threshold time Thres. If the determination is positive, then display of the new channel will be achieved more quickly by waiting for the next I picture at step 60 than by attempting to "catch-up" process the buffered data for that channel.

If the determination at step 64 is negative, then the system proceeds to step 66 where "catch-up" processing on buffered I and P pictures is performed until a current time is reached and then step 68 is performed that decodes the next picture for the newly selected channel and generates the display driving data for that picture.

Figure 6B:
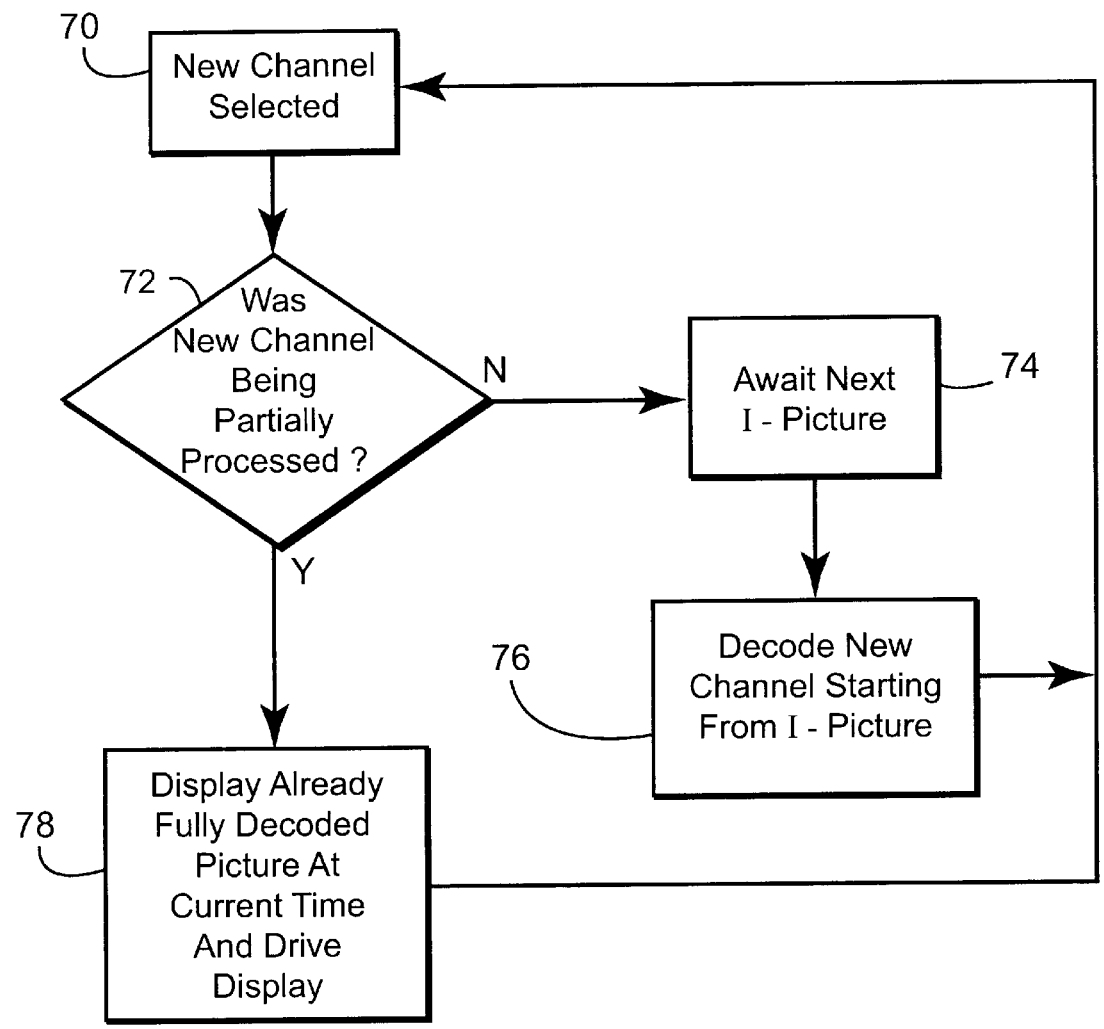

FIG. 6B illustrates a second embodiment corresponding to FIG. 5B. In this embodiment a new channel is selected at step 70. Step 72 makes a determination of whether that new channel was one that was being partially processed. If the result of the determination at step 72 is negative, then the next I picture is awaited at step 74 and then the new channel decoded at step 76 in a similar manner to steps 60 and 62 of the first embodiment.

If the determination at step 72 was positive, then the fully decoded version of that newly selected channel has already been produced and stored at step 48 of FIG. 5B and so would be available for immediate display at step 78.

Figure 6C:
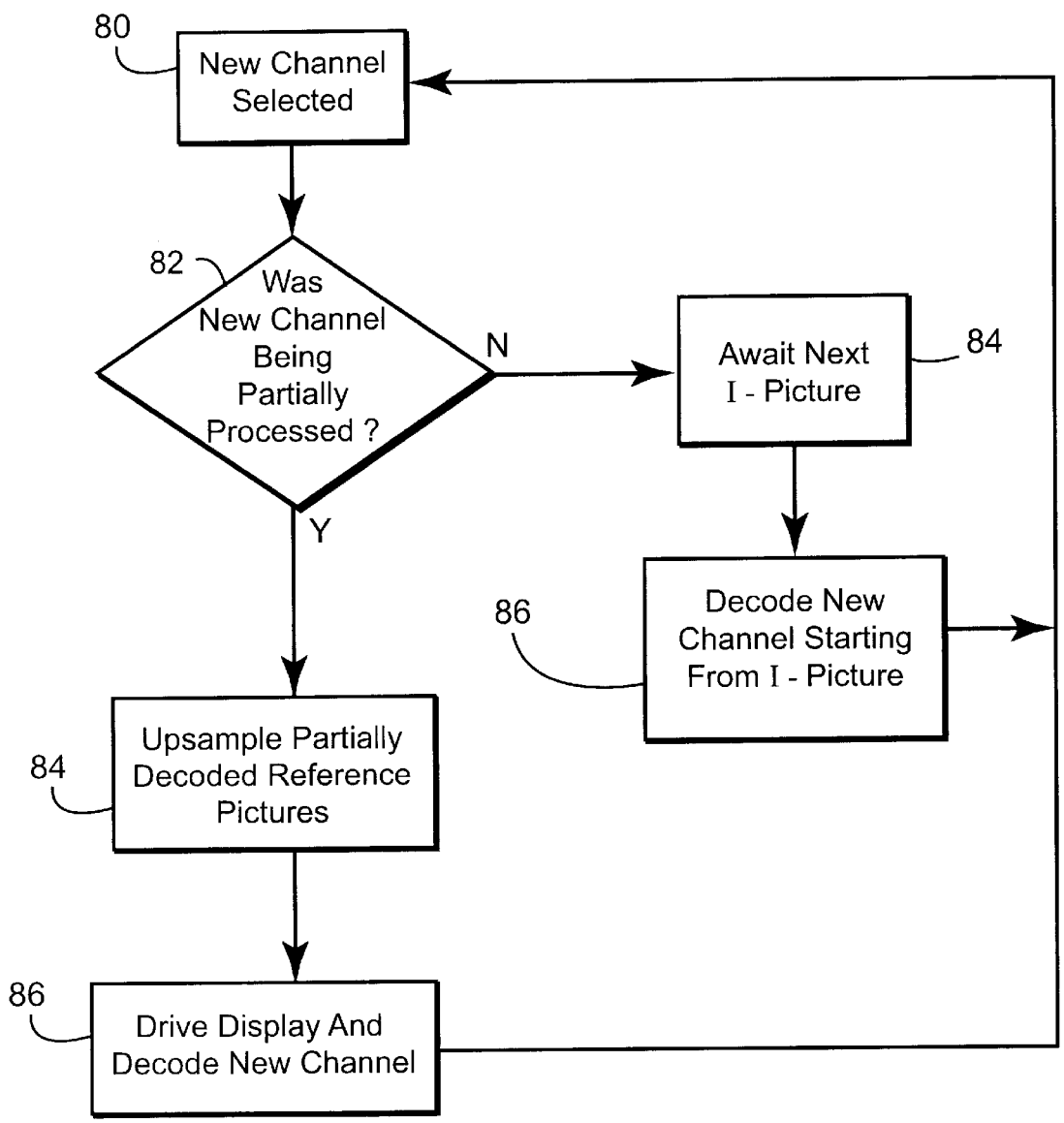

FIG. 6C illustrates a third embodiment corresponding to FIG. 5C. In this embodiment steps 80, 82, 84 and 86 perform the same function as the corresponding steps in the preceding two embodiments illustrated in FIGS. 6A and 6B.

If the determination at step 82 is positive, then step 84 serves to recover the low resolution decoded latest stored reference picture(s) or bi-directionally coded picture B if it was decoded from the memory 12 that were generated in step 52 of FIG. 5C. These low resolution versions of the pictures are then upsampled to the full resolution and may immediately start to be used to drive the display and decode further pictures from the new channel at step 86. It will be appreciated that since the spatially sub-sampled pictures that were decoded and stored in FIG. 5C are not of the full image quality, the image display produced for the new channel will be degraded, (e.g. may appear slightly blurred or blocky) until the next I picture is received and full resolution data decoded without any dependence upon spatially sub-sampled decoded data.

It will be appreciated that as well as the picture data itself other associated control data and audio data will need to be at least decoded for partially processed channels to enable rapid fill switching to those channels to be made. The storage and processing of such audio and control data can be performed in a similar way as described for the picture data and is generally less demanding on the processing resources and storage capacity on the system.

It will be appreciated that the non-selected channels being partially processed can be selected in various different ways. A common principle is that the technique should try to select for partial processing those channels that are statistically most likely to be selected next. This may be by partially processing those channels having a channel number one higher and/or lower in the channel number sequence to cater for use of the channel up/down button by the user. Another channel that may be partially processed is that previously selected as users often switch back and forth between two channels.

More sophisticated systems may determine how often each channel is selected and then monitor those that from this information are known to be often selected, e.g. a favourite sports or cartoon channel should be partially processed as well as the one up, one down and previous channels.

In systems that provide on-screen selection lists of available channels (programme guides), then another possibility is to partially process the currently highlighted channel in the selection list. A user typically first moves to highlight a channel before the selection is then made by a further key press. This can provide sufficient time to allow partial processing of the highlighted channel to be stared such that if selection is confirmed then display of the channel may start more quickly.

Although illustrative embodiments of the invention have been described in detail herein with reference to the accompanying drawings, it is to be understood that the invention is not limited to those precise embodiment, and that various changes and modifications can be effected therein by one skilled in the art without departing from the scope and spirit of the invention as defined by the appended claims.

I claim:

1. Image data decoding apparatus for decoding a stream of compressed image data representing a plurality of image channels, each image channel being encoded as sequence of intra-coded and inter-coded image pictures with decoding of a channel starting from an intra-coded image picture, said image data decoding apparatus comprising:

(i) a selected channel decoder for decoding a currently selected image channel to generate display data for driving an image display to show said currently selected channel; and (ii) a non-selected channel processor for at least partially processing at least one non-selected channel from said plurality of image channels such that switching to generating display data for driving said image display to show said at least one non-selected channel can be made without having to wait for a next intra-coded image picture to be received, wherein said non-selected channel processor buffers compressed image data for said at least one non-selected channel including a most recently received intra-coded image picture and any subsequent inter-coded image pictures used as reference pictures, wherein upon said switch said buffered compressed image data is decoded to generate display data to drive said display to show a current image picture, wherein if a next intra-coded image picture will be received in less than a threshold time, then said buffered compressed image data is not decoded and said image data decoding apparatus waits to decode said next intra-coded image picture.

2. Image data decoding apparatus for decoding a stream of compressed image data representing a plurality of image channels, each image channel being encoded as sequence of intra-coded and inter-coded image pictures with decoding of a channel starting from an intra-coded image picture, said image data decoding apparatus comprising:

(i) a selected channel decoder for decoding a currently selected image channel to generate display data for driving an image display to show said currently selected channel; and (ii) a non-selected channel processor for at least partially processing at least one non-selected channel from said plurality of image channels such that switching to generating display data for driving said image display to show said at least one non-selected channel can be made without having to wait for a next intra-coded image picture to be received, wherein said non-selected channel processor at least partially decodes said at least one non-selected channel as it is received to generate display data for said at least one non-selected channel to drive said display upon said switch.

3. Image data decoding apparatus for decoding a stream of compressed image data representing a plurality of image channels, each image channel being encoded as sequence of intra-coded and inter-coded image pictures with decoding of a channel starting from an intra-coded image picture, said image data decoding apparatus comprising:

(i) a selected channel decoder for decoding a currently selected image channel to generate display data for driving an image display to show said currently selected channel; and (ii) a non-selected channel processor for at least partially processing at least one non-selected channel from said plurality of image channels such that switching to generating display data for driving said image display to show said at least one non-selected channel can be made without having to wait for a next intra-coded image picture to be received, wherein said non-selected channel processor at least partially decodes said at least one non-selected channel as it is received to generate display data for said at least one non-selected channel to drive said display upon said switch, wherein said non-selected channel processor decodes said non-selected channel to form a spatially sub-sampled version of said non-selected channel that can be used to generate said display data upon said switch.

* * * * *